United States Patent [19]

Murakami

[11] Patent Number: 4,876,077
[45] Date of Patent: Oct. 24, 1989

[54] PROCESS FOR PRODUCING GRAPHITE

[75] Inventor: Mutsuaki Murakami, Tokyo, Japan

[73] Assignees: Research Development Corp. of Japan, Tokyo; Matsushita Elec. Industries Co. Ltd., Osaka, both of Japan; a part interest

[21] Appl. No.: 133,371

[22] Filed: Dec. 15, 1987

Related U.S. Application Data

[63] Continuation-in-part of Ser. No. 866,297, May 23, 1986, abandoned.

[30] Foreign Application Priority Data

May 30, 1985 [JP] Japan .................................. 60-115415
May 30, 1985 [JP] Japan .................................. 60-115416

[51] Int. Cl.$^4$ ............................................. G01B 31/04
[52] U.S. Cl. ..................................... 423/448; 423/449; 423/450; 423/453; 252/502; 252/503; 252/513
[58] Field of Search ............... 423/448, 449, 450, 453; 252/502, 503, 513

[56] References Cited

U.S. PATENT DOCUMENTS

| | | | |
|---|---|---|---|
| 2,915,370 | 12/1959 | Mitchell | 423/448 |
| 3,171,816 | 3/1965 | Peter et al. | 423/449 |
| 3,340,011 | 9/1967 | Hoekstra et al. | 423/453 |
| 3,528,774 | 9/1970 | Ezekiel et al. | 423/448 |
| 3,656,904 | 4/1972 | Ram | 252/502 |
| 3,940,509 | 2/1976 | Youtsey et al. | 252/502 |
| 4,014,980 | 3/1977 | Fujimaki et al. | 423/450 |
| 4,401,590 | 8/1983 | Yoshimura et al. | 252/503 |
| 4,497,728 | 2/1985 | Yoshimura et al. | 528/353 |
| 4,497,788 | 2/1985 | Bradley et al. | 423/448 |

FOREIGN PATENT DOCUMENTS

| | | | |
|---|---|---|---|
| 58-110493 | 7/1983 | Japan | 423/448 |
| 60-195014 | 10/1985 | Japan | 423/449 |
| 60-226405 | 11/1985 | Japan | 423/449 |
| 968215 | 9/1964 | United Kingdom | 423/448 |

OTHER PUBLICATIONS

Bruck, S. D., "The Relationship Between Unpaired Spin Concentration, Structure, and Electrical Conduction of a Pyrolytic Aromatic Polyimide", *Journal of Polymer Science:* Part C, vol. 17, 1967, pp. 169–185.

Murakami, M. et al., "High-Quality Pyrographite Films", *Applied Physics Letters*, vol. 48, No. 23, pp. 1594–1596, Jun. 1986.

Murakami, M. et al., "Highly Conductive Pyropolymer and High-Quality Graphite from Polyoxadiazole", *Synthetic Metals*, vol. 18, 1987; pp. 509–514.

*Primary Examiner*—John Doll
*Assistant Examiner*—Robert M. Kunemund
*Attorney, Agent, or Firm*—Stephen F. K. Yee

[57] ABSTRACT

A process for producing graphite includes heat treating, in an inert gas or in vacuo, at least one polymer selected from the group consisting of a polyphenyleneoxadiazole, polybenzothiazoles, a polybenzobisthiazole, a polybenzoxazole, a polybenzobisoxazole and a polythiazole, at a temperature of at least 1600° C., preferably at least 2000° C., for at least 30 minutes, preferably at least 60 minutes, to convert the polymer to a highly-graphitized graphite. The process produces almost perfect graphite in any shape, such as film-shaped for large-area graphite, fibrous or powdered.

14 Claims, 3 Drawing Sheets

PROCESS FOR PRODUCING GRAPHITE

CROSS REFERENCE TO RELATED APPLICATION

This application is a continuation-in-part of pending application Serial No. 866,297, filed on May 23, 1986, now abandoned.

BACKGROUND OF THE INVENTION (1) Technical Field

The present invention relates to a process for producing graphite which may be utilized in electrodes, heating elements, structures, gaskets for high-temperature and high-pressure instruments, heat-insulating materials, corrosion-resistant sealing materials, brushes for electrical uses, x-ray monochromators and the like. More particularly the invention relates to a process for producing highquality graphite by heat treating a specific polymeric material as a starting material, at particular temperatures and periods of time.

(2) Background Information

Graphite is widely used as an industrial material because of its outstanding heat and chemical resistance, high electrical conductivity and the like properties, and has been widely used as electrodes, heating elements and structures. When used in optical applications, such as a material for x-ray reflex mirrors, the purpose of using graphite can be achieved only by using substantially perfect graphite, or graphite which is 100% graphitized. Natural graphite may be used for such purposes. However, natural graphite occurs in an extremely limited amounts and is intractable because of its powder or block form. Graphite has been, therefore, artificially produced.

Processes for producing artificial graphite can be classified mainly into the following four processes.

In the first process, graphite is produced by separating it from the melts of Fe, Ni/C system, decomposition of silicon carbide, aluminum carbide and so on, or cooling of the carbon melts under elevated temperature and high pressure. Graphite obtained in such manners is called Kish graphite, and has the same properties as natural graphite. This process, however, produces only minute, flake-like graphite. Because of its complexity and expensive cost, this process has not been used in the industrial production of graphite.

In the second process, various organic or carbonaceous materials are graphitized by heating at a temperature of at least 3000° C. In this process, however, graphite having the same physical properties as those of natural graphite or Kish graphite can not be obtained. For example natural graphite and Kish graphite have an electrical conductivity in the direction of the a-axis, which is the most typical property of graphite, of from $1 \times 10^4$ S/cm to $2.5 \times 10^4$ S/cm. In contrast, the products produced by the second process generally have electrical conductivities of from $1 \times 10^3$ S/cm to $2 \times 10^3$ S/cm. Thus, the products resulting from this process are not highly graphitized. However, the products obtained by this second process have been widely employed where perfect, or highly-graphitized, graphite is not necessarily required, because of the simplicity of the manufacturing process.

Therefore, if graphite having properties similar to natural graphite can be obtained by this process, it will have significant industrial ramifications.

In the third process, graphite is produced by high-temperature decomposition, sedimentation and hot working of gaseous hydrocarbons, wherein annealing is effected at a temperature of 3400° C., under a pressure of 10kg/cm$^2$, for a long period of time. Graphite thus obtained is called highly- orientated pyrographite (HOPG) and has almost the same properties as natural graphite. For example, it has an electrical conductivity in the direction of the a-axis of $2.5 \times 10^4$ S/cm. According to this process, graphite of considerably large sizes can be prepared, unlike Kish graphite. This process, however, has disadvantages since it is complicated and expensive.

By the fourth process, natural graphite is immersed in a mixed solution of concentrated nitric acid and concentrated sulfuric acid, and thereafter the spacing between graphite layers is expanded by heating. Graphite thus obtained is called expanded graphite, and is a powder. Accordingly, it is further necessary to apply high-pressure press working in the presence of an adhesive, to make it sheet-like. Sheet-like graphite thus obtained is inferior to natural monocrystal graphite in properties. For example, the electrical conductivity of sheet-like graphite is ordinarily about $1.2 \times 10^3$ S/cm. Further, large amounts of acids are required in this process. As a result, there are many problems, such as the generation of $SO_x$ and $NO_x$ gases and the corrosion of metals due to exudation of residual acids.

As described hereinabove, the second and fourth conventional processes can not provide graphite having properties similar to those of natural monocrystal graphite. On the other hand, the first and the third processes can provide graphite having properties similar to those of natural monocrystal graphite, but have disadvantages since the processes are complicated and the products are highly expensive. The fourth process also has many other problems The problems of the second process, which is the most easily conducted, will hereinafter be considered in detail. In this process, there are usually used as starting materials a carbonaceous material, such as coke or the like, and a binder, such as coal tar or the like. However, perfect graphite can not be obtained from these starting materials as already described, even if they are heat treated at a temperatures of about 3000° C. For example, the electrical conductivity of the product is usually in the range of 100 S/cm to 1000 S/cm, which is less than one-tenth that of perfect graphite. As used herein, perfect graphite is graphite which is 100% graphitized.

With respect to carbon structures produced by heating coke or charcoal at a temperature of about 3000° C., numerous kinds of these structures exist, from one relatively near to the graphite structure to one far away therefrom. Carbon which can be relatively easily converted to a graphitic structure by the mere heat treatment in this way is called graphitizable carbon, and carbon which is not so converted is called non-graphitizable carbon. The cause for such difference in the structure is closely related to the mechanism of graphitization, and depends on whether the structural defects present in the carbon precursor are easily removed or not by the succeeding heat treatment. Therefore, the fine structure of the carbon precursor plays an important role in determining the graphitizing property.

Against these processes using coke or the like as the starting material, some studies have been carried out to produce graphitic films by heat treating polymeric materials. It has been considered that these studies intend to control the fine structure of the carbon precursor while efficiently using the molecular structure of the polymeric material. In this process, the polymeric material is heat treated in vacuo or in an inert gas, and through decomposition and polycondensation reactions, the carbonaceous material is formed. Graphitic films, however, are not necessarily obtained from all of the polymeric materials used as the starting materials. Rather most of the polymeric materials can not be used for this purpose, as explained herein below.

The terms "graphite" and "graphitization" are loosely and interchangeably used, which frequently causes confusion. For example, a material which has 50% graphite content is called graphite, while a material with 80% or 90% graphite content is also called graphite. It is known that the carbon residue formed by the heat treatment of organic materials, including polymeric materials, is necessarily graphitized in part if further heated at high temperatures, of 3000° C. or so. The resulting graphite, however, has very low graphite content. Hitherto, it has been considered that high-quality graphite, or graphite of 100% graphite content, could not be produced from polymeric materials using conventional heat treatment methods. Thus, among the objects of the present invention are to identify those polymers from the numerous polymeric materials, and the heat-treatment process, which will produce perfect or 100% graphitized graphite when treated at elevated temperatures.

The reaction pathways followed by the polymeric compounds upon heating are generally classified into three types, namely (1) gasification by random decomposition or depolymerization, (2) carbonization via pitch-like melts, and (3) carbonization while maintaining their solid state.

In the case of the reaction pathway (1), evaporation and gasification produce very little carbonaceous material. It is apparent, therefore, that this type polymer may not be used for graphitization.

Many of the materials which follow the reaction pathway (2) belong to the class of graphitizable materials. When they are merely heated in a non-oxidizing gas, however, they are lost to a great extent by evaporation and gasification. For this reason, is general, they are preliminarily heated in the presence of oxygen, to cross link the polymer chains to each other with oxygen, and thereafter carbonized or graphitized. At the same time, however this causes the polymeric materials, originally belonging to the class of graphitizable materials, to be converted to non-graphitizable materials. Accordingly, graphite having a structure close to perfect graphite can not be obtained from the polymers preliminary treated with oxygen, even if they are subsequently heat treated at a temperature of at least 3000° C.

The reaction pathway (3), namely carbonization while maintaining the solid state, is most favorable from the viewpoint of the formation of the carbonaceous materials. However, most of the polymers which decompose through pathway (3) belong to the class of non-graphitizable materials and are not capable of being converted to graphite, even if they are heat treated at a temperature of at least 3000° C. That is to say, for polymeric materials which can form graphitic films, it is necessary to satisfy consistently two requirements: that they form the carbonaceous material by the heat-treatment; and they belong to a class of graphitizable materials. Polymers which have been heat treated for such a purpose include phenol-formaldehyde resin, polyacrylonitrile, cellulose, polyamides, polyimides, polybutadiene, polyparaphenylenes, polyparaphenylene oxides, polyvinyl chloride and the like. Since all of these belong to the class of non-graphitizable materials, a product having a high degree of graphitization has not yet been obtained. The sole problem of the process for heat treating these polymers is to find such polymeric materials which can easily form highly-graphitized graphite film.

The inventor is aware of the following prior-art documents relating to the heat treatment of polymers which will be considered: U.S. Pat. Nos. 4,401,590 to Yoshimura et al., and 3,528,774 to Ezekiel et al.

Yoshimura et al. describes a process for producing a conductive pyrolytic product, and the composition incorporating such product, wherein specific types of heat-resistant polymers are heated, in vacuo, at temperatures ranging from 400° C. to 1000° C. The heating may be effected in an inert gas, such as nitrogen, with a corresponding increase in the heat-treatment time. The polymers suggest by Yoshimura et al. include polyamide-imides, aromatic polyamides and heterocyclic aromatic polymers.

As discussed below, the polymers in Yoshimura et al., when heat treated under the disclosed temperature conditions, do not produce graphite, and even when heat treated at temperatures higher than 1000° C., can not produce highlygraphitized graphite.

Ezekiel et al. describes a process for producing high-modulus, high-strength graphite fibers from polynuclear aromatic polymeric precursor materials which is first oxidized by air, ozone or a similar oxidizing agent, then treated at a temperature of at most 1500° C. for carbonization, and subsequently heated at a temperature of 1800° C.–3200° C. for an extremely brief period of time—less than one minute—for graphitization of the material. Polymers such as poly {1, 3/1, 4-phenylene-2, 5-(1, 3, 4-oxidiazole)}, aromatic polyamides, aromatic polyimides, and the like are used as starting materials.

However, as noted above in the discussion of the reaction pathway (2), polymers of the type disclosed by Ezekiel et al., after they have been subjected to an oxidization treatment, can not thereafter be converted to highly-graphitized graphite, even if they are heat treated at a temperature of at least 3000° C.

Further, as demonstrated below, heat treatment at high temperatures for short periods of time, as described in Ezekiel et al., can not produce highly graphitized graphite. Other aspects of the Ezediel et al. process will be considered below.

SUMMARY OF THE INVENTION

The present invention resolves several problems in the preparation of artificial graphite described above. It is a primary object of the present invention to provide graphite of high quality having properties similar to natural graphite by an easy process in which a polymer having a particular structure is heat treated in an inert gas or in vacuo. The present invention relates to the preparation process belonging to the second of the above-mentioned four processes for producing artificial graphite.

In a specification previously filed (Japanese Patent Application No. 214629/1982), the present inventor described that poly-p-phenylene-1, 3, 4-oxadiazole (hereinafter abbreviated POD) was converted to a nitrogen containing condensed-polycyclic structure having high electrical conductivity by heat treatment at a temperature in the range of from 520° to 1400° C., in vacuo or in an inert gas. Noting such a specific structure of heat-treated POD, the present inventor has further studied the heat treatment thereof. As a result, it has been found that POD can be more easily graphitized by heat treatment at a temperature of at least 1600° C., preferably at least 1800° C., and more preferably at least 2500° C., than any other conventional polymeric materials. In addition, graphitization of many other polymers has been attempted. It has consequently been found that three types of polybenzothiazoles, a polybenzobisthiazole, a polybenzoxazole, a polybenzobisoxazole and a polythiazole can be more easily graphitized by heat treatment at particular temperatures than any other conventional polymeric materials, thus arriving at the present invention.

In accordance with the present invention, there is provided a process for producing nearly perfect graphite which comprises heat treating at least one polymer selected from the group consisting of a polyphenyleneoxadiazole, polybenzothiazoles, a polybenzobisthiazole, a polybenzoxazole, a polygenzobisoxazole and a polythiazole, and thereby converting the polymer to highly-graphitized graphite. By using film-form polymer large-area graphite is produced.

DESCRIPTION OF THE PREFERRED EMBODIMENTS

Figure 1:
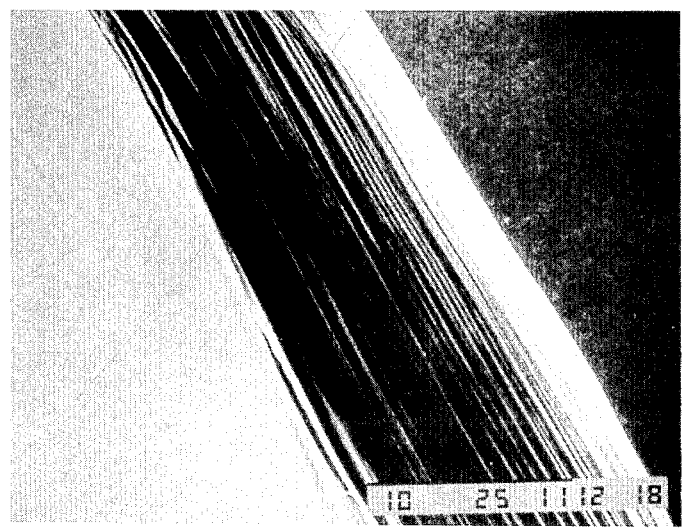
FIG. 1 is an electron microscope photograph of a cross section of a graphitized POD film.

POD, which is one of the starting materials of the present invention, is a known and heat-resistant polymer and generally obtained by cyclodehydration of the polyhydrazide prepared by polycondensation reaction of terephthalic acid and hydrazine. POD can also be obtained by the reaction of dimethyl terephthalate and sulfuric acid hydrazide the reaction of terephthalic acid chloric and hydrazine, or the like. POD is soluble in concentrated sulfuric acid, and a film obtained by casting from a solution of concentrated sulfuric acid high crystallinity. This is considered to be due to the ordered orientation of high-polar 1, 3, 4-oxadiazole rings induced by the mutual interaction of dipoles. It obviously depends on such orientation of POD that the nitrogen-containing condensedpolycyclic structure is easily produced from POD by the heat treatment at a temperature of from 52020 to 1400° C. The presence of such a nitrogen-containing condensed polycyclic structure is presumed to make the graphitization easy. The various isomers of POD also have, therefore, the similar graphitizing propertyu, if they have high crystallinity.

As the isomers of POD, there are mentioned poly (m-phenylene-1, 3, 4-oxadiazole), poly (p-phenylene-1,2, 4-oxadiazole), poly (m-phenylene-1, 2, 4-oxadiazole), poly (o-phenylene-1, 3, 4-oxadiazole), poly(o-phenylene-1, 2, 4-oxadiazole), the copolymers thereof and the like. Also, the copolymers of POD and phenylenevinylenes have the graphitizing property.

According to the present invention, POD is heated at a temperature of at least 1500° C., preferably at least 1800° C. The higher of temperature of the heat treatment, the higher degree of graphitization is obtained in a short period of time. It is, therefore, more preferable to heat POD at a temperature of at least 2000° C. The graphitization can be enhanced by carrying out this heat treatment under elevated pressure and in the presence of a catalyst. The structural formulas and abbreviations of the polymers described above, which are the other starting materials of the present invention, are shown in Table 1.

TABLE 1

| Name of polymer | Abbreviation | Structural formula |
| --- | --- | --- |
| Polybenzothiazole | PBT-1 | |
| Polybenzobisthiazole | PBBT | |
| Polybenzoxazole | PBO | |
| Polybenzobisoxazole | PBBO | |

TABLE 1-continued

| Name of polymer | Abbreviation | Structural formula |
| --- | --- | --- |
| Polybenzothiazole | PBT-2 | |
| Polybenzothiazole | PBT-3 | |
| Polythiazole | PT | |

In the present invention, the above PBT-1, PBT-2, PBT-3, PBBT, PBO, PBBO and PT are heated at a temperature of at least 1800° C, preferably at least 2000° C. The higher the temperature of the heat treatment, the higher degree of graphitization is achieved in a short period of time. It is, therefore, more preferable to heat them at a temperature of at least 2500° C. The graphitization can be enhanced by carrying out this heat treatment under elevated pressure and in the presence of a catalyst.

The pressure applied can be from 2 Kb to 10 Kb or more for POD, and from 5 Kb to 10 Kb or more for the other above-mentioned polymers. As the catalyst, there can be used an element belonging to one of the groups IVb through VIIb and VIII of the periodic table, for example, a finely-divided powder of Fe, Co, P, Sn, Ni, Sb or the like. The catalyst is added in an amount of 2% to 20% by weight. An increase of the effect is not shown and the additive is also aggregated and separated if used in larger quantity.

This heat treatment is preferably carried out in an inert gas or in vacuo. The inert gas includes, for example, helium, argon, nitrogen and the like.

By this high-temperature heat treatment, a nitrogen-containing condensed-polycyclic structure of POD releases nitrogen atoms to be converted to a condensed-polycyclic structure consisting of carbon alone. According to the results of elemental analysis, the product treated at a temperature of 1400° C. contains 4% of nitrogen. In the product treated at a temperature of at least 2500° C., no nitrogen is detected. That is to say, POD is converted from a nitrogen-containing condensed-polycyclic structure to a condensed-polycyclic structure, namely graphite, forming the boundary at a temperature of about 1400° to about 1500° C.

The characteristics of this heat-treated POD are summarized in the following two points. The first is characterized in that POD is almost completely converted to graphite at a temperature of at least 2500° C. The second is characterized in that the rapid graphitization is effected at a temperature as low as 2000° C.

With respect to the polymers of the present invention, each of the films obtained by casting and the fibers obtained by spinning has high crystallinity. These polymers are transformed to a carbonaceous material of a condensed-polycyclic structure containing a heteroatom by the heat-treatment at a temperature of about 400° C. to about 1200° C., and the carbonaceous material has the orientation, reflecting the crystallizing property of the starting material. The presence of such a controlled hetero-element-containing condensed-polycyclic structure makes the growth of a graphite structure easy. Actually, the elimination reaction of a heteroatom takes place at a temperature of at least 1400° C., and the hetero-atom-containing condensed-polycyclic structure is transformed to a condensed-polycyclic structure, namely graphite.

This manufacturing process is characterized in that graphite in any shape can be obtained by the simple procedure of heat treatment. While there are disclosed examples in which graphite films are produced by heat treating film-shaped polymers, fibrous graphite can be obtained if a fibrous polymer is used as the starting material, and as a matter of course, powdered graphite can be obtained if a powdered polymer is used.

In order to indicate the extent of graphitization, parameters measured by x-ray diffraction, such as lattice constant, crystallite size in the direction of the c-axis and the like, and the degree of graphitization calculated therefrom are usually used. Also, the value of electrical conductivity is often utilized. The lattice constant is calculated from the position of the (002) diffraction line of x-ray. It can be shown that the closer the constant is to 6.708Å, which is the lattice constant of natural monocrystal graphite, the more the graphite structure is developed. The crystallite size in the direction of the caxis is calculated from the half width of the (002) diffraction line. It is shown that the larger the value, the more planar structure of graphite is developed. The crystallite size of natural monocrystal graphite is at least 1000°. The degree of graphitization is calculated from the interplanar space ($d_{002}$) by the method described in the literature (Merig and Maire, *Les Carbons,* Vol. 1, page 129, 1965). In the case of natural monocrystal graphite, of course, it is 100%. The value of electrical conductivity refers to the value in the direction of the a-axis of graphite. For natural monocrystal graphite, its electrical conductivity is $1.0 \times 10^4$ to $2.5 \times 10^4$ S/cm. The larger the value of electrical conductivity the better is the approximation to the ideal graphite structure.

According to the present invention, at least one polymer selected from the group consisting of a polyphenyleneoxadiazole, three types of polybenzothiazole, a polybenzobisthiazole, a polybenzoxazole, a polybenzobisoxazole and a polythiazole is heat treated and thereby converted to graphite structure. This process can provide approximately perfect graphite which can not conventionally be obtained, by an extremely simple procedure in which the polymer is merely heat treated in an inert gas or in vacuo, without the conventional preliminary oxidation treatment. Further, according to the process of the present invention, graphite in any shape, namely film-shaped, fibrous, or powdered graphite, can be easily produced according to the demand. This process can be said, therefore, to be excellent.

Graphite obtained by the process of the present invention can be widely utilized in electrodes, heating elements, structures, gaskets for high-temperature and high-pressure instruments, heat-insulating materials, corrosion-resistant sealing materials, brushes for electrical applications, x-ray monochromators and the like.

The present invention will now be described in detail with reference to the following examples that by no means limit the scope of the invention.

The extent of graphitization is evaluated by the values of lattice constant, degree of graphitization, electrical conductivity and the like.

The individual properties of graphite is measured according to the following procedures.

1. Lattice constant ($C_o$)

The x-ray diffraction line of the sample is measured by the Cu K$\alpha$-ray using a Phillips Model PW-1051 x-ray diffractometer. The value of $C_o$ is calculated from the (002) diffraction line which appears around $2\theta$ equal to 26° to 27° by using the following Bragg's formula:

$$n\lambda = 2d \sin \theta$$

where 2d is equal to $C_o$, n is equal to 2, and $\lambda$ is the wavelength of x-ray.

2. Crystallite size ($L_c$)

Crystallite size ($L_c$) is calculated from the half breadth ($\beta$) of the diffraction line obtained by correcting the (002) diffraction line, according to the following relational formula:

$$L_c = \frac{K\lambda}{\beta \cdot \cos\theta}$$

where K is the shape factor.

3. Degree of graphitization (%)

The degree of graphitization is calculated from the value of interplanar spacing (d) by using the following formula:

$$d_{002} = 3.354g + 3.44(1-g)$$

where g shows the extent of graphitization, from perfect graphite when g is equal to 1, to the amorphous graphite when g is equal to 0.

4. Electrical conductivity (S/cm)

The sample is fitted with four-terminal electrodes by using silver paste and gold wires. The value of electrical conductivity is determined by applying electric current to the outer electrodes and measuring the voltage drop at the inner electrodes, and further determining the width, length and thickness of the sample under a microscope.

EXAMPLE 1

25 $\mu$-thick POD films, each of which was sandwiched by graphite substrates, were heat treated in an argon flow at desired temperatures ($T_p$) for one hour, after temperatures were increased at a rate of 10° C./min. The temperature was then lowered at a rate of 20° C./min.

This heat treatment comprised a first heat treatment carried out at a temperature of not higher than 1400° C. and a main heat treatment carried out at a temperature above 1600° C. The first heat treatment was performed using an infrared heater and the main heat treatment was conducted in an electric furnace equipped with carbon heaters. The black films obtained at temperatures ($T_p$) of not higher than 1400° C. were brittle and had reduced flexibility. At temperatures ($T_p$) of at least 2000° C., however, flexible films were obtained.

In Table 2 there are shown data of electrical conductivity, lattice constant, crystallite size and degree of graphitization measured for POD films treated at various temperatures.

Under these heat-treating conditions, graphitization is initiated at a temperature of at least 1600° C., and rapidly proceeds at a temperature of 2000° C. to 2500° C. At 2500° C., the degree of graphitization is already up to 97%, and perfect graphite (100% graphitization) is obtained at 2800° C. The values of lattice constant, crystallite size and the like of this perfect graphite are similar to those of single crystal graphite. As described above, it has hitherto been attempted to graphitize various polymeric materials. POD is one of the materials whose graphitization. POD is one of the materials whose graphitization reaction easily proceeds at temperatures as low as about 2000° C., and therefore, it is an excellent raw material for producing high-quality graphite.

Similar results also can be obtained with the other inert gases or in vacuo.

TABLE 2

| $T_p$ (°C.) | Lattice constant $C_o$ (Å) | Crystallite size $L_c$ (Å) | Degree of graphitization (%) | Electric conductivity (S/cm) |
|---|---|---|---|---|
| 600 | 7.01 | 10 | 0 | $1.5 \times 10^{-5}$ |
| 800 | 6.91 | 13 | 0 | 68 |
| 1000 | 6.93 | 15 | 0 | 345 |
| 1200 | 6.90 | 22 | 0 | 410 |
| 1400 | 6.89 | 25 | 0 | 510 |
| 1600 | 6.88 | 40 | 0 | 750 |
| 1800 | 6.86 | 75 | 11 | 900 |
| 2000 | 6.828 | 280 | 30 | 1400 |
| 2200 | 6.756 | 850 | 72 | 2300 |
| 2500 | 6.714 | >1000 | 97 | 7500 |
| 2800 | 6.708 | >1000 | 100 | 10000 |
| 3000 | 6.708 | >1000 | 100 | 14000 |

EXAMPLE 2

In order to compare the excellent graphitizing property of POD with that of the other polymers, four polymers were heat treated at a temperature of 2500° C., in the same manner as in Example 1. Shown in Table 3 are in the names of the polymers employed, the structural formulas thereof, and the values of lattice constant, degree of graphitization and electrical conductivity measured for the heat-treated materials, together with those of POD.

The degree of graphitization (97%) of POD achieved at 2500° C. is much higher than that achieved with the other four polymers. Also, the value of electrical conductivity measured for the heat-treated material (graphite) of POD is significantly higher, namely from about 7 to 50 times, than that of the heat-treated materials of the other polymers. It is thus apparent that POD has excellent graphitizing property as compared with the other polymers.

EXAMPLE 3

In the heat treatment for graphitizing POD, the actions and effects due to pressure were examined. The first heat treatment at a temperature of 520° to 1400° C. and the main heat treatment at a temperature of above 1600° C. were carried out under atmospheric pressure and under elevated pressures of 2 Kb, 5 Kb and 10 Kb. All heat-treating conditions, except for pressure, were the same as in Example 1. The results obtained by examining the progress of graphitization of POD are shown in Table 4.

It is obvious from these results that increased pressure causes POD to be graphitized at a lowered heat-treating temperature. For example, rapid graphitization is initiated at a temperature of at least 2000° C. under atmospheric pressure. However, under an increased pressure of 2 Kb, it is initiated at a temperature of at least 1800° C., and under pressures of 5 Kb and 10 Kb, it is initiated at a temperature of at least 160020 C. That is to say, POD can be easily graphitized at lower temperatures by conducting the heat treatment under elevated pressure.

TABLE 3

| Name of polymer (Abbreviation) | Structural formula | Lattice constant $C_o$ (Å) | Degree of graphitization (%) | Electric conductivity (S/cm) |
|---|---|---|---|---|
| Polyimide (PI)* | (structure) | 6.797 | 48 | 520 |
| Polyamide-imide* (PAI) | (structure) | 6.854 | 15 | 150 |
| Polyamide (1)* (AP-1) | —CO—⌬—CONH—⌬—NH— | 6.838 | 24 | 1000 |
| Polamide (2)* (PA-2) | —CO—⌬—CONH—⌬—NH— | 6.787 | 54 | 1200 |
| POD | (structure with N—N, O) | 6.714 | 97 | 7500 |

TABLE 4

| Temperature °C. | Pressure (Kb) | Lattice constant $C_o$ (Å) | Degree of graphitization (%) | Electric conductivity (S/cm) |
|---|---|---|---|---|
| 1400 | Atmospheric pressure (Ap) | 6.89 | 0 | 510 |
| 1600 | Ap | 6.87 | 0 | 750 |
| 1800 | Ap | 6.86 | 11 | 900 |
| 2000 | Ap | 6.828 | 30 | 1400 |
| 2200 | Ap | 6.756 | 72 | 2300 |
| 2500 | Ap | 6.714 | 97 | 7500 |
| 2800 | Ap | 6.708 | 100 | 10000 |
| 1400 | 2Kb | 6.89 | 0 | 540 |
| 1600 | 2Kb | 6.87 | 6 | 800 |
| 1800 | 2Kb | 6.83 | 29 | 1200 |
| 2000 | 2Kb | 6.76 | 70 | 2400 |
| 2200 | 2Kb | 6.720 | 93 | 7000 |
| 2500 | 2Kb | 6.708 | 100 | 10000 |
| 1400 | 5Kb | 6.88 | 0 | 600 |
| 1600 | 5Kb | 6.86 | 12 | 1300 |
| 1800 | 5Kb | 6.750 | 76 | 2600 |
| 2000 | 5Kb | 6.717 | 95 | 8000 |
| 2200 | 5Kb | 6.710 | 99 | 9600 |
| 1400 | 10Kb | 6.88 | 0 | 610 |
| 1600 | 10Kb | 6.84 | 23 | 1800 |
| 1800 | 10Kb | 6.74 | 81 | 4700 |
| 2000 | 10Kb | 6.712 | 98 | 10000 |
| 2200 | 10Kb | 6.708 | 100 | 13000 |

EXAMPLE 4

It is known that elements belonging to the groups IVb through VIIb and VIII of the periodic table can be used as a catalyst in graphitization reactions. Such an effect is observed also in the graphitization reaction of POD, whereby the temperature of the graphitization reaction can be lowered. The films, including finely-divided powders of Fe, Co, P, Sn, Ni and Sb, respectively, in an amount of 5% by weight based on POD, were heated at a temperature of 200020 C. The heat treatment was conducted in the same manner as in Example 1. Data for lattice constant and degree of graphitization measured for the resulting films are given in Table 5.

In each case, the degree of graphitization was significantly improved, compared with the case (30%) when no additive was incorporated.

This shows that the above finely-divided powders of Fe, Co and the like effectively acted as a catalyst. It was found that the graphitization was effectively performed when the above element was added in an amount of at least 2% by weight. It was further observed that the additive was aggregated and separated, and that a further increase of the catalytic effect was not shown when the additive was used in an amount of more than 20% by weight.

EXAMPLE 5

While all of the heat-treating times in Examples 1 to 4 were one hour, the results obtained by varying the heattreating time are shown in Table 6. The heat-treating conditions, except for time, were the same as in Example 1.

From the results shown in Table 6, it can be seen that the longer heat-treating time gives the higher degree of graphitization.

TABLE 5

| Additive | Addition amount (% by weight) | Lattice constant $C_o$ (Å) | Degree of graphitization (%) |
| --- | --- | --- | --- |
| None | 0 | 6.828 | 30 |
| Fe | 5 | 6.772 | 63 |
| Co | 5 | 6.769 | 65 |
| P | 5 | 6.781 | 58 |
| Sn | 5 | 6.780 | 58 |
| Ni | 5 | 6.765 | 67 |
| Sb | 5 | 6.770 | 64 |

TABLE 6

| Temperature (°C.) | Time (min.) | Lattice constant $C_o$ (Å) | Degree of graphitization (%) |
| --- | --- | --- | --- |
| 1400 | 10 | 6.90 | 0 |
| 1400 | 60 | 6.89 | 0 |
| 1400 | 360 | 6.88 | 0 |
| 1600 | 10 | 6.88 | 0 |
| 1600 | 60 | 6.87 | 6 |
| 1600 | 360 | 6.848 | 17 |
| 1800 | 10 | 6.87 | 6 |
| 1800 | 60 | 6.86 | 11 |
| 1800 | 360 | 6.830 | 29 |
| 2000 | 10 | 6.86 | 11 |
| 2000 | 60 | 6.828 | 30 |
| 2000 | 360 | 6.762 | 67 |

As described above, it is obvious from the results of Examples 3 through 5 that the heat-treating temperature required for the graphitization of POD varies with pressure, the presence of a catalyst, treating time and the like. At a temperature not higher than 1400° C., however, a number of nitrogen atoms remain in heat-treated POD. These nitrogen atoms can not be removed even by the action of pressure or a catalyst. On the contrary, nitrogen atoms are removed at a temperature of at least 1600° C. Therefore, graphitization can be substantially enhanced by the action of pressure or a catalyst. Accordingly, it can be concluded that the temperature required for the graphitization of POD is at least 1600° C.

With regard to the upper limit of the heat-treating temperature, there is no restriction of particular significance. The condition which is economically optimum in the relationship between the treating and the treating time may be selected. However, a temperature of not more than 3600° C. is usually employed considering the heat resistance of the furnace or the consumption of a heater.

As the inert gas used in the heat treatment, there can be mentioned helium and nitrogen, in addition to argon. The heat treatment can also be carried out in vacuo. Particularly when the temperature is less than 2000° C., the heat treatment in nitrogen or in vacuo is effective. However, when the heat-treating temperature is at least 2000° C., it is desirable to use argon or helium. Though the heat treatment may be achieved in oxygen, the yield is low.

EXAMPLE 6

15 μ-thick PBBT films, each of which was sandwiched by graphite substrates, were heat treated in a stream of argon at desired temperatures ($T_p$) for one hour, after the temperatures were increased at a rate of 10° C./min. The temperatures were then lowered at a rate of 20° C./min. A carbon heater furnace (Shinsei Electric Furnace Model 46-1) was employed for the heat treatment. The black films obtained at temperatures ($T_p$) of not higher than 1600° C. were brittle and had reduced flexibility. At temperatures ($T_p$) of at least 2200° C., however, the flexible films were obtained.

In Table 7, there are given data for electrical conductivity, lattice constant, crystalline size and degree of graphitization measured for PBBT films treated at various temperatures.

Under these heat-treating conditions, graphitization in initiated at a temperature of at least 2000° C., and rapidly proceeds at a temperature of 2200° to 2500° C. At 2500° C., the degree of graphitizatio is already up to 83%, and almost perfect graphite is obtained at a temperature of 2800° to 3000° C. The values of lattice constant, crystallite size and the like of this almost perfect graphite are approximately similar to those of natural monocrystal graphite. Although it has hitherto been attempted to graphitize various polymeric materials, as described above, PBBT is one of the materials whose graphitization reaction most easily proceeds.

EXAMPLE 7

Ten polymers, PBT-1, PBT-2, PBT-3, PBBT, PBO, PBBO, PT, a polyimide (Kapton®), a polyamide (Kevlar®) and a polyamideimide, were heat treated at temperatures of 2500° C. and 3000° C., in the same manner as in Example 1. The results obtained are shown in Table 8. PBT-1, PBT-2, PBT-3, PBBT, PBO and PBB all had a degree of graphitization of more than 80% by the heat treatment at 2500° C., and were almost perfectly converted to graphite by the heat treatment at 3000° C. Such a degree of graphitization is much higher compared with that of heat-resistant polymers such as polyimide, polyamide, polyamideimide and the like. It is thus apparent that PBT, PBBT, PBO and PBBO each have excellent graphitizing property.

TABLE 7

| $T_p$ (°C.) | Lattice constant $C_o$ (Å) | Crystallite size $L_c$ (Å) | Degree of graphitization (%) | Electric conductivity (S/cm) |
|---|---|---|---|---|
| 1000 | 6.93 | 12 | 0 | — |
| 1200 | 6.92 | 18 | 0 | — |
| 1400 | 6.90 | 20 | 0 | 450 |
| 1600 | 6.89 | 24 | 0 | 600 |
| 1800 | 6.87 | 60 | 5 | 800 |
| 2000 | 6.84 | 190 | 23 | 1100 |
| 2200 | 6.78 | 500 | 58 | 1500 |
| 2500 | 6.737 | >1000 | 83 | 2800 |
| 2800 | 6.715 | >1000 | 96 | 6900 |
| 3000 | 6.708 | >1000 | 100 | 10000 |

TABLE 8

| Polymer | Treating temperature (°C.) | Lattice constant $C_o$ (Å) | Degree of graphitization (%) | Electric conductivity (S/cm) |
|---|---|---|---|---|
| PBT-1 | 2500 | 6.739 | 82 | 2700 |
|  | 3000 | 6.709 | 99 | 9700 |
| PBBT | 2500 | 6.737 | 83 | 2800 |
|  | 3000 | 6.708 | 100 | 10000 |
| PBO | 2500 | 6.740 | 81 | 2500 |
|  | 3000 | 6.709 | 99 | 9000 |
| PBBO | 2500 | 6.738 | 83 | 2900 |
|  | 3000 | 6.709 | 99 | 9800 |
| PBT-2 | 2500 | 6.740 | 81 | 2300 |
|  | 3000 | 6.711 | 98 | 8000 |
| PBT-3 | 2500 | 6.738 | 83 | 2200 |
|  | 3000 | 6.712 | 98 | 8900 |
| PT | 2500 | 6.745 | 78 | 1700 |
|  | 3000 | 6.715 | 96 | 7800 |
| Polyimide | 2500 | 6.797 | 48 | 520 |
| * | 3000 | 6.735 | 84 | 3000 |
| Polyamide | 2500 | 6.838 | 24 | 1000 |
| * | 3000 | 6.730 | 87 | 2500 |
| Polyamide-imide * | 2500 | 6.854 | 15 | 150 |
|  | 3000 | 6.777 | 60 | 600 |

* Comparative example

EXAMPLE 8

In the heat treatment for graphitizing each polymer of PBT-1, PBBT, PBO and PBBO, the actions and effects of pressure were examined. The results obtained by the heat treatment under an elevated pressure of 5 Kb are shown in Table 9. All of the heat-treating conditions, with the exception of pressure, were the same as in Example 1. It is obvious from these results that increased pressure enhances the graphitization and lowers the graphitizing temperature. For example, rapid graphitization initiated at a temperature of at least 2000° C. under atmospheric pressure. However, under increased pressure of 5 Kb, it is initiated at a temperature of at least 1800° C. That is to say, the graphitization of these polymers can be easily enhanced by conducting the heat treatment under elevated pressure.

Similar results can be expected also be other inert gases or in vacuo.

As discussed above, when polymer materials are heated in the presence of an oxidizing agent, such as oxygen or the like, cross linkages of oxygen are formed between the polymer chains, even for POD. Thus, perfect graphitization can not be achieved, even if the polymeric materials are heated at elevated temperatures thereafter. High-temperature heating for a short period of time, as described in the aforesaid Ezekiel et al. patent, can not possibly provide highly-graphitized graphite. This is shown by the results in Table 6, above for treatment temperatures not exceeding 2000° C.

TABLE 9

| Polymer | Temperature °C. | Pressure (Kb) | Lattice constant $C_o$ (Å) | Degree of graphitization (%) |
|---|---|---|---|---|
| PBBT | 1600 | Atmospheric pressure (Ap) | 6.89 | 0 |
|  | 1800 | Ap | 6.87 | 5 |
|  | 2000 | Ap | 6.84 | 23 |
|  | 2200 | Ap | 6.78 | 58 |
|  | 2500 | Ap | 6.737 | 83 |
| PBBT | 1600 | 5 | 6.88 | 0 |
|  | 1800 | 5 | 6.85 | 17 |
|  | 2000 | 5 | 6.77 | 64 |
|  | 2200 | 5 | 6.731 | 87 |
|  | 2500 | 5 | 6.710 | 99 |
| PBT-1 | 1800 | 5 | 6.84 | 23 |
|  | 2000 | 5 | 6.75 | 76 |
|  | 2500 | 5 | 6.712 | 98 |
| PBO | 1800 | 5 | 6.87 | 5 |
|  | 2000 | 5 | 6.78 | 58 |
|  | 2500 | 5 | 6.713 | 97 |
| PBBO | 1800 | 5 | 6.85 | 17 |
|  | 2000 | 5 | 6.74 | 81 |
|  | 2500 | 5 | 6.712 | 98 |

EXAMPLE 9

To demonstrate and compare the effects of heating temperatures higher than 2000° C. and increased heating time, the experiments and the conditions of the first heat treatment employed in Example 1 above were repeated, using the same types of POD film, and varying the heat treating temperature (Tp) and time. More specifically, the POD films were subjected to a first heat treatment at 500° C. for one hour. The high temperature heating was conducted at each treatment temperatures (Tp) for periods of 2 minutes, 10 minutes, 30 minutes and one hour, respectively. The temperature in the heater was increased at the rate of 20° C./min. The results shown in Table 10 below were obtained.

As apparent from a comparison of Tables 2 and 10, it can be seen that not only the heating temperature, but also the length of heat-treating time, are important to achieve a high degree of graphitization. The degree of graphitization and the electrical conductivity are lowered with a decrease in the heat treating time. When a polymer such as polyamide, polyacryllonitrile, or the like is treated at a temperature of 3000° C. for one hour, graphitization in the range of 60% to 84% and an electrical conductivity of less than 3000 S/cm can be obtained. Note Table 8. With respect to POD, similar values can be obtained by heat treatment at a lower temperature, of 2200° C. Further, graphitization of close to 90% can be achieved for POD by heat treatment at a temperature of about 2500° C., for 30 minutes. Graphitization of close to 97% is achieved by the treatment at a temperature of 2800° C. for 25 minutes.

Thus, in order to obtain excellent graphite, a considerably long period of time is required for the heat treatment. Hence, high-temperature heat treatment for an extremely short period of time, such as the 30 seconds to 1 minute time described in the aforesaid Ezekiel et al. patent, can not provide excellent graphite having a degree of graphitization of more than 90%.

TABLE 10

| Tp (°C.) | Heat-treating time(min) | Lattice constant $c_o$ (Å) | Crystallite size $L_c$ (Å) | Degree of graphitization (%) | Electric conductivity (S/cm) |
|---|---|---|---|---|---|
| 2200 | 2 | 6.86 | 75 | 11 | 900 |
|  | 10 | 6.822 | 300 | 33 | 1500 |
|  | 30 | 6.801 | 430 | 46 | 1700 |
|  | 60 | 6.756 | 850 | 72 | 2300 |
| 2500 | 2 | 6.81 | 200 | 41 | 1650 |
|  | 10 | 6.780 | 700 | 58 | 2000 |
|  | 30 | 6.728 | 960 | 88 | 5400 |
|  | 60 | 6.714 | >1000 | 97 | 7500 |
| 2800 | 2 | 6.73 | 670 | 87 | 5300 |
|  | 10 | 6.724 | 980 | 91 | 7500 |
|  | 30 | 6.714 | >1000 | 97 | 7900 |
|  | 60 | 6.708 | >1000 | 100 | 10000 |
| 3000 | 2 | 6.720 | 950 | 93 | 8000 |
|  | 10 | 6.712 | >1000 | 98 | 9200 |
|  | 30 | 6.708 | >1000 | 100 | 13000 |
|  | 60 | 6.708 | >1000 | 100 | 14000 |

EXAMPLE 10

To assess the effects of an initial oxidation treatment, POD films were preliminarily heat treated for 10 minutes in air (i.e., in the presence of oxygen), and subsequently heat treated at various temperatures (Tp) for one hour. Shown in Table 11 are the data for lattice constant, crystallite size, degree of graphitization and electrical conductivity.

In comparing the data in Table 11 with Table 2, Example 1, which were obtained by a heat treatment argon gas, without the preliminary oxidation treatment in air, it is apparent that the graphitization progress is disturbed by the oxidation treatment.

POD treated at a temperature of 300° C. in air for 10 minutes shows the same data as those of POD preliminarily heat treated in an argon gas. This result is to be expected since the oxidation reaction does not proceed at all under the treatment condition of 300° C. for 10 minutes because POD is heat-resistant. When POD is heat treated at a temperature of more than 350° C., oxidation of POD proceeds, with an accompanying decrease in the degree of graphitization. When POD is preliminarily heat treated at a temperature of 500° C. in air, the material burns completely. Such results show that the oxidation treatment has an unfavorable influence upon the graphitizing reaction, and POD, which initially belongs to the class of graphitizable polymers, is converted to a non-grahitizable material.

Thus, while a process such as disclosed in Ezekiel et al., wherein the polymeric materials are initially heated in the presence of the oxidizing agent, and thereafter heated at elevated temperatures for a short period of time, may suggest that the heating of nitrogen-containing aromatic hydrocarbons provides graphitized materials having a high strength, it is apparent that graphite of good quality, namely 100% graphitized, can not be obtained.

TABLE 11

| Preliminary heat treatment temperature in air, for 10 min. (°C.) | Tp (°C.) | Lattice constant Co (Å) | Crystallite size (Å) | Degree of graphitization (%) | Electric conductivity (S/cm) |
|---|---|---|---|---|---|
| 300 | 2000 | 6.830 | 280 | 30 | 1400 |
|  | 2600 | 6.713 | >1000 | 97 | 8000 |
|  | 3000 | 6.708 | >1000 | 100 | 14000 |
| 350 | 2000 | 6.834 | 230 | 27 | 1300 |
|  | 2600 | 6.716 | >1000 | 95 | 6700 |
|  | 3000 | 6.708 | >1000 | 100 | 12000 |
| 400 | 2000 | 6.840 | 100 | 11 | 1100 |
|  | 2600 | 6.721 | >1000 | 92 | 5800 |
|  | 3000 | 6.714 | >1000 | 97 | 8500 |
| 450 | 2000 | 6.86 | 70 | 0 | 950 |
|  | 2600 | 6.741 | >1000 | 80 | 3300 |
|  | 3000 | 6.718 | >1000 | 94 | 7000 |
| 500 | 2000 | — | — | — | — |
|  | 2600 | — | — | — | — |
|  | 3000 | — | — | — | — |

In order to further clarify the foregoing, attempts were made to graphitize POD films according to the process disclosed in Ezekiel el al.

EXAMPLE 11

Data was obtained for the degree of graphitization and the electrical conductivity for POD films preliminarily heat treated at a temperature of 450° C. in air for 10 minutes and subsequently burnt in a furnace maintained at a temperature of 2000° to 3000° C. in an inert gas for 2 minutes. The results are shown in Table 12.

TABLE 12

| Tp (°C.) | Degree of Graphitization (%) | Electrical Conductivity (S/cm) |
|---|---|---|
| 2000 | 0 | 700 |
| 2600 | 12 | 870 |
| 3000 | 37 | 1600 |

As is apparent from these results, the process of Ezekiel et al. provides a material having only 37% graphitization and an electrical conductivity of only 1600 S/cm, even if the treatment is conducted at a temperature of 3000° C.

Next, consideration was given to the effect, if any, upon the graphitization process due to the form of the starting material. Polymeric material in fibrous form, as used in the aforesaid Ezekiel et al. patent, and in the film form, as in the present invention, were considered. Common sense would indicate that if the starting materials are identical in composition, the chemical reaction during heat treatment would be the same. It is difficult to consider that the chemical reaction would be affected by the form of the starting material. Also, it was thought that the same carbon or graphite must be obtained if the heat treating conditions are identical for each form of the starting material. In actuality this was not so. For POD, it was found that the degree of carbonization or graphitization was different for fibrous starting material and for the film form.

EXAMPLE 12

POD identical to the POD films used in the Examples above, but in fiber form, were heat treated under various conditions. In Table 13, there are shown data for lattice constant $C_o$, degree of graphitization and electrical conductivity measured for the heat-treated POD fibers.

TABLE 13

| Preliminary heat treatment temperature in air, for 10 min. (°C.) | Tp (°C.) | Lattice constant $C_o$ (Å) | Degree of graphitization (%) | Electric conductivity (S/cm) |
| --- | --- | --- | --- | --- |
| none | 2000 | 6.85 | 17 | 820 |
|  | 2600 | 6.762 | 69 | 1200 |
|  | 3000 | 6.745 | 78 | 2000 |
| 300 | 2000 | 6.87 | 6 | 790 |
|  | 2600 | 6.771 | 63 | 1000 |
|  | 3000 | 6.745 | 78 | 2000 |
| 350 | 2000 | 6.89 | 0 | 720 |
|  | 2600 | 6.78 | 58 | 1000 |
|  | 3000 | 6.750 | 76 | 1700 |
| 400 | 2000 | 6.90 | 0 | 700 |
|  | 2600 | 6.78 | 58 | 950 |
|  | 3000 | 6.762 | 69 | 1500 |
| 450 | 2000 | 6.95 | 0 | 670 |
|  | 2600 | 6.79 | 52 | 940 |
|  | 3000 | 6.770 | 64 | 1400 |
| 500 | 2000 | — | — | — |
|  | 2600 | — | — | — |
|  | 3000 | — | — | — |

Comparing Table 13 with Table 2, Example 1, and Table 11 shows that the degree of graphitization obtained when fibrous POD is graphitized is much lower than that obtained when film-form POD is graphitized. For example, when filmform POD was heat treated at a temperature of 3000° C. for one hour without the preliminary oxidation treatment 100% graphitization is obtained and the electrical conductivity is 14,000 to 18,000 S/cm. In contrast, for fibrous POD the degree of graphitization is only 78% and, more significantly, the electrical conductivity is 2,000 S/cm, which is only one-seventh to one-ninth the value obtained for film-form POD. When a preliminary oxidation treatment is carried out, these characteristics are further lowered.

Until now it was not known that the graphitization of fibrous POD was so remarkably deteriorated, compared with that of film-form POD. This phenomenon will hereinafter be described further in detail.

Figure 2:
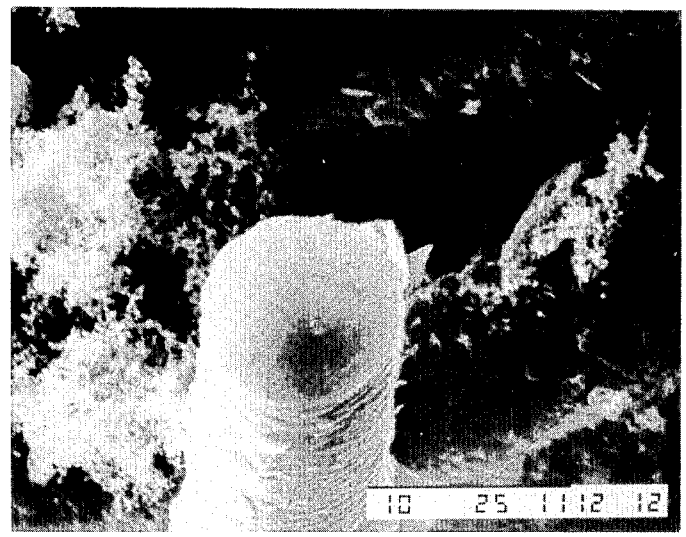
FIG. 2 is an electron microscope photograph of a cross section of a graphitized pod fiber.

FIG. 1 shows a cross-sectional photograph of film graphitized by heat treating film-form POD at a temperature of 3,000° C., for 1 hour, and FIG. 2 shows a cross-sectional electron microscope photograph of fiber graphitized by treating fibrous POD at a temperature of 3,000° C., for one hour. The development of the very fine lamella structure is observed in the cross section of the graphite film prepared from the film-form sample. Such development of the structure is considered to result in the promotion of graphitization and the formation of excellent graphite film. On the contrary, such development of the lamella structure is not observed at all in the cross section of the graphite fiber prepared from the fibrous sample. This is considered to cause the formation of fibers having a lower degree of graphitization.

Figure 3A:
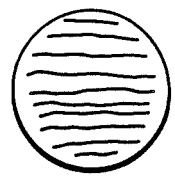
FIGS. 3a and 3b are schematic cross sections of POD fiber showing the possible orientations of the lamella structure formed during graphitization.
Figure 3B:
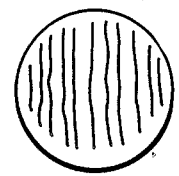
Figure 3C:
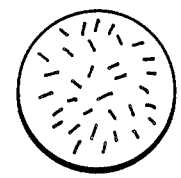
FIG. 3c is a schematic cross section of POD fiber after graphitization.

An explanation of why such a lamella structure occurs is as follows. In the fibrous sample, its physical form appears to be essentially responsible for preventing development of the lamella structure. That is to say, because the cross section of the fibrous sample is circular the lamella structure will not necessarily develop in one direction only. When the orientations illustrated in FIGS. 3a and 3b are considered, both are equivalent. Therefore, the lamella structure will not develop in one direction only, and a randomized structure as shown in FIG. 3c will be provided.

Figure 4A:
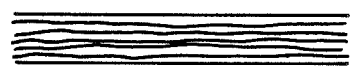
FIGS. 4a and 4b are schematic cross sections of POD film showing the possible orientations of the lamella structure formed during graphitization.
Figure 4B:
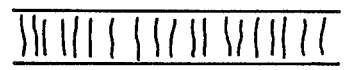

On the other hand, with film-form POD the molecules are inclined to be oriented in the direction of the film surface because some degree of strain is inevitably applied to the film during its formation. This is considered to affect the development of the lamella structure in the graphitization process. Therefore, for the film form of POD, the lamella structure shown in FIG. 4a is more easily formed than that shown in FIG. 4b.

That is to say, in the case of the fiber, even if the molecules are oriented in one direction by applying stress to the fiber during its formation as the starting material, it is only a uniaxial drawing of the material. Consequently, the lamella structure shown in FIG. 3c will be produced during heat treatment. In contrast, film can be biaxially drawn during formation. Therefore, the lamella structure as shown in FIG. 4a will be developed during graphitization. Such a development of the lamella structure essentially depends upon the difference in form between the starting materials. This shows that the film is essentially different from the fiber in the graphitization process.

The fact described above clearly shows that the fibrous starting materials, such as described in the Ezekiel et al. patent, can not be converted to perfect graphite, even if they are treated under the same conditions as those of the present invention, namely at a temperature of 3,000° C. for more than one hour. The disorder of the orientation of the fibrous sample as described above is truly the cause of the significant lowering in electrical conductivity.

Consideration will now be directed to the influence on the graphitizing reaction of the type of polymeric starting material.

In the present invention, p-phenylene-(1,3,4 oxadiazole) has been used in the Examples, which means 1,4 phenylene-2,5-(1,3,4-oxadiazole), a homopolymer, This polymer differs from poly{1,3/1,4-phenylene-2,5-(1,3,4-oxadiazole}described in the aforesaid Ezekiel et al. patent, which is a copolymer consisting of two kinds of polyphenylene-oxadiazole polymers shown below.

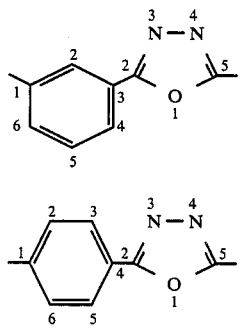

Figure 5A:
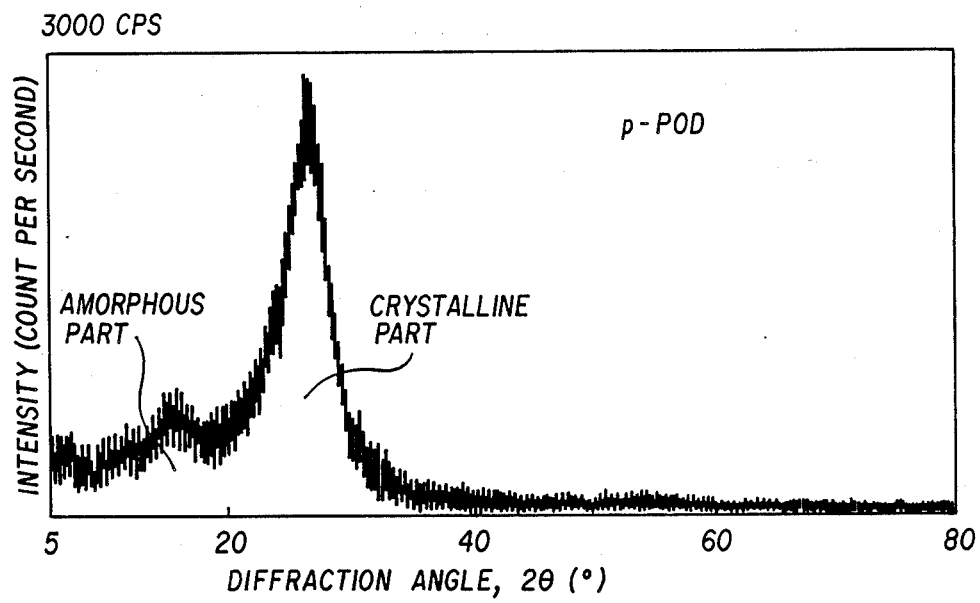
FIGS. 5a and 5b are x-ray data showing the crystallinity of p-POD and p/m-POD, respectively.
Figure 5B:
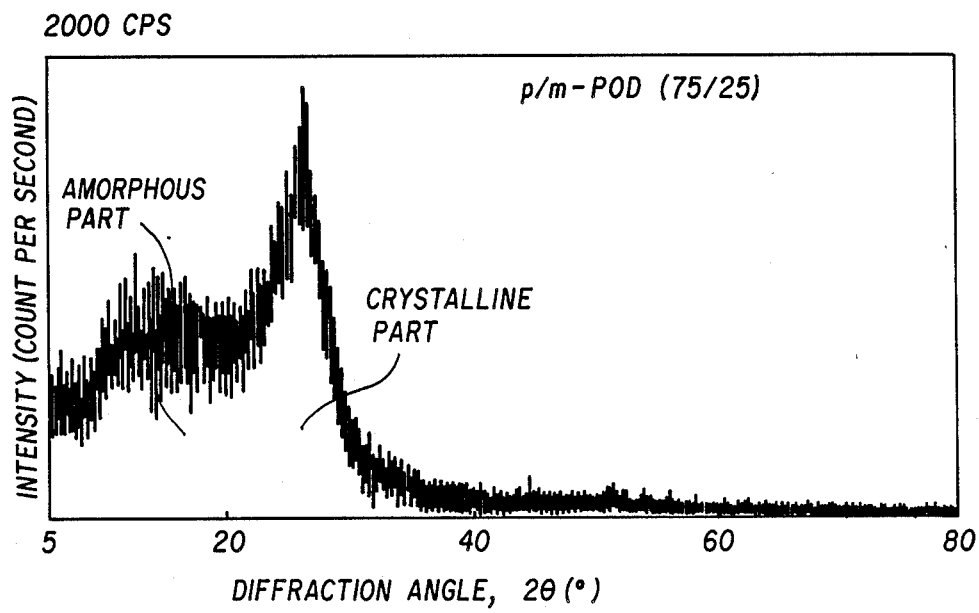

As described above, any polymer having excellent crystallinity can provide graphite of good quality, even if it is a meta form, a para form, or mixture thereof. Generally speaking, for condensation polymers, a para form tends to provide a polymeric film having a high crystallinity, but a meta form or a mixture of m/p forms tends to provide a film having a lower crystallinity. For example, Kevlar (Du Pont), which is well known as a polyamide having a crystallinity of more than 90%, consists of a pure para form, while Normex, consisting of a metal form, has a crystallinity of less than 5%. Similarly, in the case of POD the incorporation of a metal form in a para form tends to lower the crystallinity. For example, with respect to the sample materials described herein, pure para POD had a crystallinity of 70%, but POD of a copolymer (p/m=75/25) prepared in a similar manner had a crystallinity of 40%. X-ray data showing the crystallinity of p-POD and p/m-POD are shown in FIGS. 5a and 5b, respectively.

In Table 14, there are shown data for lattice constant $C_o$, degree of graphitization (%) and electrical conductivity (S/cm) measured for pure p-POD and p/m-POD (p/m=75/25) heat treated at 2000°, 2600° and 3000° C. for one hour, respectively.

TABLE 14

| | Heat Treatment Temperature Tp (°C.) | Lattice Constant Co (Å) | Degree of Graphitization (%) | Electrical Conductivity (S/cm) |
|---|---|---|---|---|
| P- | 2000 | 6.828 | 30 | 1400 |
| | 2600 | 6.712 | 98 | 8700 |
| | 3000 | 6.708 | 100 | 14000 |
| p/m = | 2000 | 6.840 | 23 | 1200 |
| 75/25 | 2600 | 6.732 | 86 | 5500 |
| | 3000 | 6.727 | 89 | 7400 |

These results show that the degree of graphitization is substantially lowered by incorporating 25% of a meta form. That is to say, it is considered that the crystallinity is decreased by the incorporation of a metal form and, accordingly, the degree of graphitization is lowered.

The p/m ratio of the copolymer is not described in the Ezekiel et al. patent. However, it can at least be expected that the crystallinity is naturally lowered by the incorporation of a meta form and thereby the degree of graphitization will be also lowered. In the Ezekiel at al. patent, a meta form is perhaps incorporated to increase the strength of the treated fiber.

Although preferred embodiments of the present invention have been described, it is to be understood that modifications and variations may be made by those skilled in the art without departing from the spirit and scope of the invention as defined by the appended claims.

What is claimed is:

1. A process for producing graphite, which comprises heat treating a film-shaped polymer selected from the group consisting of poly (m-phenylene-1,3,4-oxadiazole), poly (p-phenylene-1,3,4-oxadiazole), polybenzothiazoles, a polybenzobisthiazole, a polybenzoxazole, a polybenzobisoxazole and a polythiazole in an inert gas atmosphere or in vacuo, at a temperature of at least 2500 ° C., for at least 30 minutes, and thereby converting the polymer to highly-graphitized graphite.

2. A process for producing graphite as defined in claim 1, wherein the polymer is heat treated under increased pressure.

3. A process as defined in claim 2, wherein the pressure is at least 2 kb.

4. A process as defined in claim 2, wherein the pressure is at least 5 kb.

5. A process for producing graphite as defined in claim 1, wherein the polymer is heat treated in the presence of an element belonging to one of the groups IVb through VIIb and VIII of the periodic table.

6. A process for producing graphite as defined in claim 5, wherein the element is present in an amount of between 2% and 20% by weight.

7. A process for producing graphite as defined in claim 2, wherein the polymer is heat treated in the presence of an element belonging to one of the groups IVb through VIIb and VIII of the periodic table.

8. A process as defined in claim 1, wherein the polymer is heat-treated for at least 60 minutes.

9. A process as defined in claim 1, wherein the polymer is selected from the group consisting of poly (m-phenylene-1,3,4-oxadiazole), poly (o-phenylene-1,3,4-oxadiazole), and poly (p-phenylene-1,3,4-oxadiazole).

10. A process as defined in claim 8, wherein the polymer is selected from the group consisting of poly (m-phenylene-1,3,4-oxadiazole), poly (o-phenylene-1,3,4-oxadiazole), and poly (p-phenylene-1,3,4-oxadiazole).

11. A process as defined in claim 1, wherein the polymer is selected from the group consisting of poly (m-phenylene-1,3,4-oxadiazole), poly (o-phenylene-1,3,4-oxadiazole), and poly (p-phenylene-1,3,4-oxadiazole).

12. A process as defined in claim 5, wherein the polymer is selected from the group consisting of poly (m-phenylene-1,3,4-oxadiazole), poly (o-phenylene-1,3,4-oxadiazole), and poly (p-phenylene-1,3,4-oxadiazole).

13. A process as defined in claim 7, wherein the polymer is selected from the group consisting of poly (m-phenylene-1,3,4-oxadiazole), poly (o-phenylene-1,3,4-oxadiazole), and poly (p-phenylene-1,3,4-oxadiazole).

14. A process as defined in claim 9 wherein the polymer is poly [p-phenylene-2,5-(1,3,4-oxadiazole)].

* * * * *